United States Patent [19]

Schwarz

[11] 4,360,637

[45] Nov. 23, 1982

[54] ENGINEERING THERMOPLASTIC OF A DIOL BIS(ALLYL CARBONATE) AND A COPOLYMER OF AN ACRYLATE OF A CYCLOALKYL DIENE

[75] Inventor: Richard A. Schwarz, Akron, Ohio

[73] Assignee: PPG Industries, Inc., Pittsburgh, Pa.

[21] Appl. No.: 330,425

[22] Filed: Dec. 14, 1981

[51] Int. Cl.$^3$ .......................................... C08F 263/00
[52] U.S. Cl. .................................... 525/277; 525/289
[58] Field of Search .............................. 525/277, 289

[56] References Cited

U.S. PATENT DOCUMENTS

| | | | |
|---|---|---|---|
| 2,384,123 | 9/1945 | Muskat et al. | 260/78 |
| 2,568,658 | 9/1951 | Pope | 260/77.5 |
| 3,013,305 | 12/1961 | de Gooreynd | 18/47.5 |
| 3,872,042 | 3/1975 | Bond | 260/23 |
| 4,217,433 | 8/1980 | Dyball | 525/277 |

*Primary Examiner*—J. Ziegler
*Attorney, Agent, or Firm*—Richard M. Goldman

[57] ABSTRACT

Disclosed is a polymerizable resin, a method of polymerizing the resin, and the polymerizate prepared thereby. The resin contains a monomeric diol bis(allyl carbonate) and a copolymer of (a) a vinyl unsaturate and (b) an acrylate of a cycloalkyldiene.

16 Claims, No Drawings

ENGINEERING THERMOPLASTIC OF A DIOL BIS(ALLYL CARBONATE) AND A COPOLYMER OF AN ACRYLATE OF A CYCLOALKYL DIENE

DESCRIPTION OF THE INVENTION

Bis(allyl carbonate) monomers yield hard resin polymers having superior optical properties. However, the full utilization of these materials has been limited because only mold casting has been hitherto found to yield useful articles.

Mold casting is a time consuming process, yielding products of relatively simple geometry. Moreover, mold casting requires large numbers of individual casting molds.

Commonly assigned, copending U.S. Application Ser. No. 219,063, filed Dec. 22, 1980 by Crano et al. for METHOD OF POLYMERIZING BLENDS OF BIS-(ALLYL CARBONATE) MONOMERS AND POLYMER BLENDS PREPARED THEREBY discloses that diol bis(allyl carbonate) monomers containing a second polymer, e.g., a copolymer, dispersed therein possess properties of fabricability in the course of polymerization. Crano et al. disclose that in this narrow interval the polymerizate may be comminuted and thereafter fused. Crano et al. further disclose that in this interval the polymerizate, when compressed, does not expel, lose or ooze liquid, and that in this interval the polymerizate may be formed into complex shapes without fracturing.

Crano et al. further disclose that diol bis(allyl carbonate) monomer in admixture with compatible polymers may be worked, as by extrusion, molding, or the like, and thereafter polymerized or further polymerized to yield a hard resin.

The copolymers disclosed by Crano et al. are characterized as a copolymer of (1) a vinyl unsaturate, exemplified by acrylates, and (2) a vinyl-allyl unsaturate, exemplified by allyl acrylates. An especially preferred copolymer is disclosed to be allyl methacrylate-methyl methacrylate.

It has now been found that a particularly desirable copolymer is a copolymer of (1) a vinyl unsaturate, and (2) an acrylate of a cycloalkyldiene.

DETAILED DESCRIPTION OF THE INVENTION

According to one exemplification of the invention herein contemplated, the polymerization of diol bis(allyl carbonate) monomers is admixture with a copolymer of (1) a vinyl unsaturate, and (2) a cycloalkyldiene acrylate, e.g., to form a polymer blend, may be postponed or interrupted to recover a fabricable, workable, pseudoplastic resin, polymerizate, or intermediate. This pseudoplastic resin can be worked, e.g., as described hereinbelow, and polymerization continued either simultaneously with working or subsequently thereto.

By a fabricable, workable, or pseudoplastic polymer is meant a diol bis(allyl carbonate) material that softens and flows upon application of heat or pressure or heat and pressure, is processable, fusible, extrudable, injection moldable, transfer moldable, and the like, and exhibits rheological properties associated with pseudoplastic and thermoplastic properties. By pseudoplastic properties are meant that the log shear stress versus log shear rate is, at constant temperature, a smooth, increasing function, with shear stresses of $10^3$ to $10^7$ dynes per square centimeter producing shear rates of 10 to 10,000 per second.

The interval when the diol bis(allyl carbonate)-polymer blend is pseudoplastic occurs after the viscosity has begun to increase, e.g., due to either the addition of the compatible polymer or to polymerization, but before a rigid polymerizate is formed. During the interval of fabricability, the extent or degree of polymerization, or completion of reaction is high enough, or the physical structure of the blend is such, whereby to avoid driving off, expelling, or oozing liquid during working, but low enough to retain fusibility of the polymerizate. The interval of fabricability may be found by routine experimentation.

It is believed that a homomonomer-polymer blend system containing a polymer dissolved in or swollen by and containing diol bis(allyl carbonate) monomer yields an interpenetrating network of two polymers. It is believed that the polymerization of the diol bis(allyl carbonate) with the swollen or solubilized polymer favors a wider range of degree or extent of total polymer content in which the polymerizate is workable, fabricable, or thermoplastic than a bis(allyl carbonate) homomonomer-homopolymer.

According to a method of this invention, a composition is prepared containing diol bis(allyl carbonate) monomer, and a copolymer of (1) a vinyl unsaturate, and (2) a cycloalkyldiene acrylate. The polymerization, if any, to yield a fabricable polymer, is commenced by the addition of an initiator, e.g., a peroxy initiator, and heating the liquid composition. If the reaction is not interrupted, the reaction ultimately yields a hard resin. However, over a measurable range of extent of reaction or degree of polymerization, beginning for some diol bis(allyl carbonate)-poly (vinyl unsaturate-cycloalkyldiene acrylate) systems as low as no diol bis(allyl carbonate) polymerization, and for other systems after several minutes to several hours of reaction, the reaction mixture is workable, fabricable, or pseudoplastic. Prior to fabricability, the reaction mixture oozes liquid when worked, while subsequent to fabricability the reaction mixture is not fusible. The time required to attain fabricability is a function of the temperature, the free radical polymerization initiator, the concentration of the free radical polymerization initiator, the polymer, and the concentration of the polymer. For a composition containing diol bis(allyl carbonate) monomer, 20 weight percent 100,000 molecular weight poly(methyl methacrylate-dicyclopentadiene acrylate), and 3 weight percent benzoyl peroxide, basis diol bis(allyl carbonate) monomer, the time for the onset of fabricability may be from about 120 minutes at 60 degrees Centigrade to about 10 hours at 40 degrees Centigrade. For lesser amounts of benzoyl peroxide, the time to attain fabricability is longer, while for greater amounts, the time is shorter.

According to this invention a copolymer of (a) a vinyl unsaturate and (b) an acrylate of a cycloalkyldiene is added to the diol bis(allyl carbonate) monomer. The vinyl unsaturate has the formula

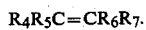

$R_4$, $R_5$, and $R_6$ may be hydrogen, with $R_7$ being —H, as in ethylene, —CH$_3$ as in propylene, —Cl as in vinyl chloride, C$_6$H$_5$ as in styrene, —O—CO—CH$_3$ as in vinyl acetate, —O—CH$_2$CH$_3$ as in vinyl ethyl ether, —O—CH$_3$ as in vinyl methyl ether, —CO—OH as in acrylic acid, —CO—O—CH₃ as in methyl acrylate, —CO—O—CH₂CH₃ as in ethyl acrylate, or —CO—NH₂ as in acrylamide. Alternatively, $R_6$ and $R_7$ may be —Cl as in vinylidene chloride. Alternatively, $R_6$ may be —CH₃ and $R_7$ may be —CO—OH as in methacrylic acid, —CO—O—CH₃ as in methyl methacrylate, or —CO—O—CH₂CH₃ as in ethyl methacrylate. Especially preferred are the acrylic acids and acrylates, i.e., acrylic acid methacrylic acid, ethacrylic acid, methyl methacrylate, ethyl methacrylate, methyl ethacrylate, and ethyl ethacrylate.

The cyclo alkyl diene acrylate has the formula

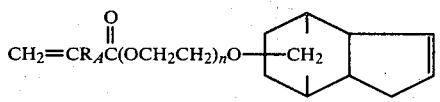

where $R_A$ is chosen from the group consisting of —H and CH₃, and n is from 0 to 5, with n equal to 0 or 1 being prefered.

The copolymer typically has a viscosity average molecular weight above about 10,000, for example from about 50,000 to about 500,000 grams per mole.

The copolymer contains from about 75 to about 98 weight percent of the vinyl unsaturate moiety and the balance the cycloalkyldiene acrylate moiety.

An especially preferred copolymer is a copolymer of dicyclopentadiene methacrylate and methyl methacrylate containing about 85 to about 95 weight percent methyl methacrylate, balance dicyclopentadiene methacrylate.

As herein contemplated, the pseudoplastic resin is prepared from a composition of bis(allyl carbonate) and a copolymer of a vinyl unsaturate and a cycloalkyldiene acrylate. The copolymer is either soluble in the diol bis(allyl carbonate), swollen by the diol bis(allyl carbonate), swollen by and partially soluble in the bis(allyl carbonate) or introduced into the diol bis(allyl carbonate) in a solvent. The copolymer should both be resistant to destruction by the peroxy initiators used to polymerize the bis(allyl carbonate), and not interfere therewith.

As used herein, the terms "working" and "fabrication" are synonymous with and refer to processes including mixing the viscous, pseudoplastic resins; milling the viscous, pseudoplastic resins; comminuting the pseudoplastic resins; blending the comminutes of the pseudoplastic resins; extrusion of the pseudoplastic resins; forming of film, sheetings, and tubing of the pseudoplastic resins; calendering of the pseudoplastic resins; fiber spinning, filament spinning, and "melt" spinning, e.g., at temperatures low enough to substantially avoid polymerization initiation, of the pseudoplastic resins; laminating the pseudoplastic resins, e.g., as a film, sheet, layer, coating, or substrate; molding of the pseudoplastic resins, e.g., compression molding, injection molding, casting, blow molding, transfer molding and stamping; foaming of the pseudoplastic resins; and sheet forming of the pseudoplastic resins.

According to one exemplification, the resins herein contemplated may be formed by combining diol bis(allyl carbonate) monomer with the poly(vinyl unsaturate-cycloalkyldiene acrylate) polymer to yield a fabricable resin without polymerization. Alternatively, the admixture thereof may be partially polymerized to yield a fabricable resin. By a fabricable resin is meant a resin having a shear stress of $10^3$ to $10^7$ dynes per square centimeter at a shear rate of 10 to $10^4$ per second.

According to an alternate exemplification, the fabricable resins herein contemplated, formed either upon mixing or upon subsequent polymerization to a fabricable state, may be extruded. The feed to the extruder may be particles, pellets, or other comminutes of the fabricable resin. Alternatively, the feed may be a continuous ribbon of fabricable resin. The fabricable resin is carried through the extruder to die means by conveyor means, e.g., a screw conveyor. The viscous flow of resin through the extruder heats the resin. As the heating may be sufficient to cause further polymerization within the extruder, it may be necessary to cool the extruder whereby to avoid curing and hardening within the extruder.

The die means may be a tee shaped die, whereby to form film or sheet. The film or sheet may be drawn up on a roller, either with or without thinning, with subsequent curing. For example, a section of film or sheet may be cut, or molded, or shaped, or flattened, or the like, and thereafter cured to form a hard resin.

Alternatively, the die means may be ring shaped, with a mandrel therein, whereby to form a tube. Additionally, an air bubble may be introduced, whereby the tube or sleeve of resin is formed around the air bubble, the air bubble, once formed, acting like a shaping mandrel. According to this exemplification, the tube or sleeve of fabricable material may thereafter be cured to yield a hard resin tube.

According to a further alternative exemplification, the fabricable resin may be extruded through a filament or fiber forming die, e.g., a spinneret having a plurality of holes, or a slot die. As herein contemplated, the fabricable resin may be fed to the spinneret by a screw extruder or a gear pump. The feed of fabricable resin may be substantially free of solvents, containing mainly resin, as in melt spinning. Alternatively, the resin feed may contain solvent, which solvent evaporates during, or after, or during and after fiber formation, as in dry spinning.

According to a further exemplification herein contemplated, the fabricable resin may be used to form a laminate. For example, a laminate may be formed of two sheets of fabricable resin, with subsequent chemical reaction, i.e., polymerization, forming a bond therebetween. Alternatively, a laminate may be formed of one sheet of the fabricable resin, and one sheet of another material, the sheet of fabricable resin bonding to the other material upon subsequent curing.

According to a further exemplification herein contemplated, the fabricable resin may be compression molded, e.g., by a sequence of pressurized flow, molding, and reaction. As herein contemplated, the viscous, fabricable resin is forced into a cavity or mold, and maintained in the mold under conditions where further cure, e.g., cross linking, may occur.

In one exemplification, a thin sheet, section, or biscuit of fabricable resin may be molded in a flash mold molding press, the faces of which are negatives of the desired product. The sheet, section, or biscuit is heated in the mold, i.e., to cure the fabricable resin, with simultaneous compression, e.g., up to 200 pounds per square inch, or higher, for example, up to 3000 pounds per square inch. In this way, video discs, records, laser readable computer memory discs, diffraction gratings, fresnel lenses, optical lenses, and the like may be prepared.

According to a further alternative exemplification, the fabricable resin of this invention may be injection molded. As herein contemplated, injection means, e.g., a piston, ram, plunger, screw or reciprocating screw, drives the resin through a cylinder, a nozzle at the end of the cylinder, a sprue bushing, a gate, and a runner into a molding cavity. The resin may be introduced into the cylinder as a ribbon, stream, or comminute. The driving of the viscous resin by the piston, ram, plunger, screw, or reciprocating screw converts mechanical energy into thermal energy, adiabatically heating the polymerizate. It may therefore be necessary to cool the cylinder whereby to avoid curing, cross linking, or polymerization within the cylinder. After curing in the cavity, e.g., partial curing or even complete curing, the finished casting is ejected from the cavity. In this way lenses may be injection molded to shape.

According to a still further exemplification, the fabricable resin may be transfer cast, i.e., transferred into a mold and allowed to cure.

The above methods of fabricating the fabricable resin may be combined. For example, fabricable resin may be comminuted, mixed, and thereafter extruded to a sheet or film, or molded.

According to a further exemplification, the fabricable resin may be utilized as an adhesive. For example, fabricable resin as a ribbon, film, comminute, particulate, or sheet, may be placed between two objects, e.g., two lenses, and cured or cured and compressed, whereby to cause the objects to adhere together.

After working the fabricable resin, the fabricable resin is cured to yield polymerizate, i.e., a hard resin. By a hard resin is meant a resin having a Rockwell hardness of greater than M100, a tensile strength of at least about 5000 pounds per square inch, a flexural strength of at least about 8000 pounds per square inch, a compressive strength of at least about 20,000 pounds per square inch, a compressive strength modulus at 100,000 pounds per square inch of at least about 2.5, a Notched Izod Impact strength of at least about 0.2 foot-pounds per square inch, and an unnotched Izod Impact Strength of at least about 1.5 foot-pounds per square inch.

The curing may be carried out by heating the worked, fabricable resin. The heating is typically to above about 80° Centigrade, e.g., to about 100° Centigrade or even 110° Centigrade. The time required to attain a temperature above about 80° Centigrade should be fast enough to provide economical use of equipment, but slow enough to avoid gas bubble formation, cracking, and discoloration of the resulting polymerizate. The time required to attain a temperature above about 80° Centigrade is dependent upon the initiator, the amount of initiator, and previous extent of cure. Generally, the cumulative amount of cure, i.e., from initial polymerization, if any, of the monomeric diol bis(allyl carbonate) to the recovery of the fabricable resin, and the final cure of the fabricable resin after working, is about one to twenty hours when the initiator is benzoyl peroxide, and it is present in the original monomer at about 3.0 weight percent.

While the final cure may be carried out in a water bath or in an oven, it may also be commenced during working, i.e., by extruding the fabricable polymerizate over heated rollers, or injecting the heated polymerizate into a heated mold.

Alternatively, the final cure may be carried out by ultrasonic heating or microwave heating.

Diol bis(allyl carbonate) monomers which may be polymerized by the method of this invention are normally linear, liquid allyl carbonates, i.e., glycol bis(allyl carbonate) compounds, in which the allyl groups may be substituted at the 2 position with a halogen, notably chlorine or bromine, or a 1 to 4 carbon alkyl group, generally a methyl or ethyl group, and the glycol group may be an alkylene, alkylene ether, or alkylene polyether group having from 2 to 10 carbons and oxygens. These bis(allyl carbonate) monomers are represented by the formula:

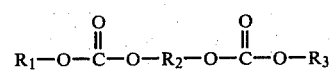

where $R_1$ and $R_3$ are allyl or substituted allyl groups, and $R_2$ is as defined below. $R_1$ and $R_3$ are independently represented by the formula:

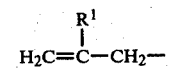

where $R^1$ may be hydrogen, halogen, or a 1 to 4 carbon alkyl group. Specific examples of $R_1$ and $R_3$ include allyl, 2-chloroallyl, 2-bromoallyl, 2-iodoallyl, 2-fluorallyl, 2-methallyl, 2-ethylallyl, 2-isopropylallyl, 2-n-propylallyl, and 2-n-butylallyl groups. Most commonly, $R_1$ and $R_3$ are allyl groups, $H_2C=CH-CH_2-$. Such compounds and methods for making them are disclosed in U.S. Pat. Nos. 2,370,567 and 2,403,113.

Specific examples of $R_2$ are alkylene groups such as ethylene, trimethylene, methylethylene, tetramethylene, ethylethylene, pentamethylene, hexamethylene, 2-methylhexamethylene, octamethylene, and decamethylene groups, alkylene ether groups such as $-CH_2-O-CH_2-$, $-CH_2CH_2-O-CH_2CH_2-$, $-CH_2-O-CH_2-CH_2-$, and $-CH_2CH_2CH_2-O-CH_2CH_2CH_2-$, alkylene polyether groups such as $-CH_2-CH_2-O-CH_2CH_2-O-CH_2CH_2O-CH_2CH_2-$ and $-CH_2-O-CH_2-$ groups, alkylene carbonate groups such as $-CH_2CH_2-O-CO-O-CH_2CH_2-$ and $-CH_2CH_2-O-CH_2CH_2-O-CO-O-CH_2CH_2-OCH_2CH_2-$ groups and alkylene polycarbonate groups. Most commonly, $R_2$ is $-CH_2CH_2-$ or $CH_2CH_2-O-CH_2CH_2-$.

Commercially important bis(allyl carbonate) monomers which may be polymerized by the method herein contemplated are:

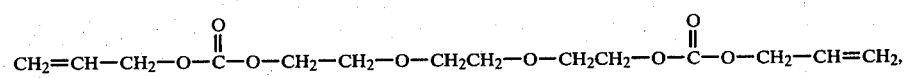

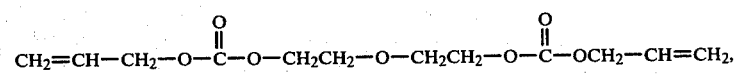

and 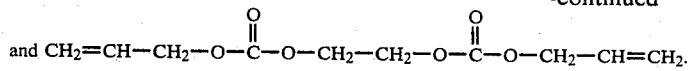

Other examples of bis(allyl carbonate) monomers useful in carrying out the method herein contemplated include ethylene glycol bis(2-chloroallyl carbonate), diethylene glycol bis(2-methallyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), and pentamethylene glycol bis(allyl carbonate).

The copolymer of the vinyl unsaturate and the cycloalkyldiene acrylate may be added directly to the diol bis(allyl carbonate) monomer. Alternatively, the copolymer may be added to an organic solvent, e.g., methylene chloride, whereby to form a solution. Thereafter, the diol bis(allyl carbonate) monomer is added to the solution, and the solvent driven off, e.g., by distillation, evaporation, boiling, or the like.

According to a preferred exemplification, i.e., where the copolymer is a high molecular weight copolymer of a vinyl unsaturate and a cycloalkyldiene acrylate, e.g., a copolymer of methyl methacrylate and dicyclopentadiene acrylate with a macromolecule molecular weight above about 100,000 grams per mole, in order to obtain high levels of the copolymer, i.e., above about 8 to 15 weight percent, the macromolecule is first dissolved in a solvent. Especially preferred are those solvents having a solubility parameter of about 9.0 to about 10.0 (calories/cubic centimeter)$^{-0.5}$, where the solubility parameter is the square root of the cohesive density, as described in F. Rodriquez, *Principles of Polymer Systems*, McGraw-Hill Book Co., New York, N.Y., (1970), and Beerbower, Kaye, and Pattison, *Chem. Engr.*, Dec. 18, 1967, page 118.

Exemplary solvents include halogenated hydrocarbons, such as methylene chloride, chloroform, dichloroethylene, ethylene dichloride, tetrachloroethane, tetrachloroethylene, trichloroethane, trichloroethylene, aromatics, such as benzene, nitrobenzene, orthodichlorobenzene, styrene, and chlorobenzene, and hydrocarbons. Alternatively, other solvents, such as benzaldehyde, carbon disulfide, chlorobromomethane, cyclohexanone, ethyl chloroformate, diethylene glycol, diphenyl, turpentine, cyclohexane, isooctane, and nitrobenzene may be used.

The amount of solvent is generally from about one to about twenty-five times the weight of polymer, and generally from about four to about twenty times.

The polymerization of the diol bis(allyl carbonate), e.g., to yield the first, pseudoplastic resin, and to thereafter yield the rigid polymerizate, i.e., the hard resin polymerizate, is initiated by the creation of active centers, e.g., free radicals. Useful free radical initiators are peroxy initiators. The peroxy initiators include: isobutyryl peroxide; di(2-ethylhexyl) peroxydicarbonate; acetyl cyclohexane sulfonyl peroxide; di(sec-butyl) peroxydicarbonate; diisopropyl peroxydicarbonate; 2,4-dichlorobenzoyl peroxide; t-butyl peroxypivalate; decanoyl peroxide; lauroyl peroxide; propionyl peroxide; 2,5-dimethyl-2,5-bis(2-ethyl hexylperoxy) hexane; acetyl peroxide; succinic acid peroxide; t-butyl peroxyoctoate; benzoyl peroxide; p-chlorobenzoyl peroxide; t-butyl peroxyisobutyrate; t-butyl peroxymaleic acid; bis(1-hydroxycyclohexyl) peroxide, 1-hydroxy-1'-hydroperoxy dicyclohexyl peroxide; t-butyl peroxyisopropyl carbonate; 2,5-dimethyl-2,5-bis(benzoylperoxy) hexane; t-butyl peroxyacetate; methyl ethyl ketone peroxides; di-t-butyl diperoxyphthalate and t-butyl peroxybenzoate.

Especially preferred peroxy initiators are those that do not discolor, char, or burn the resulting polymerizate. Exemplary are diisopropyl peroxydicarbonate and benzoyl peroxide.

According to one preferred embodiment, poly(methyl methacrylatedicyclopentadiene methacrylate) is dissolved in methylene chloride. The composition is agitated until it is clear. Thereafter it is fed to a reactor and diisopropyl peroxydicarbonate is added to the composition. Diethylene glycol bis(allyl carbonate) is then added to the reactor to provide a solution that is 15 weight percent poly(methyl methacrylatedicyclopentadiene methyl methacrylate), balance diethylene glycol bis(allyl carbonate), basis total copolymer and diethylene glycol bis(allyl carbonate). The composition is stripped to drive off and recover the methylene chloride. The composition is then heated to 40° Centigrade and maintained thereat for about 45 minutes, whereby to form a fabricable pseudoplastic polymerizate.

The fabricable polymerizate is placed in a compression mold and compressed to 2,000 pounds per square inch for 60 minutes, at about 60 degrees Centigrade. Thereafter, a hard cured sheet is recovered.

Higher or lower amounts of polymer could have been used, polymers other than poly(methyl methacrylate-dicyclopentadiene methacrylate) could have been used, and solvents other than methylene chloride could have been used.

According to a still further embodiment, a polymer containing 85 to 95 weight percent methyl methacrylate, balance dicyclopentadiene acrylate, and having an apparent molecular weight of 400,000 to 600,000 grams/mole by inherent viscosity versus polymethyl methacrylate, is prepared. The copolymer is added to methylene chloride to yield a 8 to 25 weight percent solution of the copolymer in methylene chloride.

Diethylene glycol bis(allyl carbonate) is added to the methylene chloride-poly(methyl methacrylate-dicyclopentadiene acrylate) solution to produce a solution containing 70 percent diethylene glycol bis(allyl carbonate), basis total diethylene glycol bis(allyl carbonate) and poly(methyl methacrylate-dicyclopentadiene acrylate). Benzoyl peroxide is added to the composition. The methylene chloride is boiled off. The polymerization is carried out to yield a fabricable pseudoplastic resin.

The fabricable resin is fed through an injection molder to a planoconcave lens mold and heated to about 80° to 110° Centigrade over a period of 16 to 24 hours to yield a hard resin lens.

The following example is illustrative:

EXAMPLE

A copolymer of methyl methacrylate and dicyclopentadiene acrylate was prepared and thereafter copolymerized with diethylene glycol bis(allyl carbonate).

A liquid composition was prepared containing 85 grams of methyl methacrylate, and 15 grams of Dow Chemical Company XAS 1837 dicyclopentadiene acrylate in 300 milliliters of $CH_2Cl_2$. This composition was placed in a 28 ounce bottle. To this composition was added 1 milliliter of neat sec-butyl peroxydicarbonate. The bottle was maintained at 25 degrees Centigrade for 72 hours. The resulting copolymerizate of methyl methacrylate and dicyclopentadiene acrylate had a viscosity of 0.565 dl/g.

The copolymerizate was coagulated with methanol, and washed with isopropanol. Thereafter six grams of the copolymerizate and 34 grams of PPG Industries Inc. CR-39 ® diethylene glycol bis(allyl carbonate) and 1.02 grams of benzoyl peroxide were dissolved in $CH_2Cl_2$. The $CH_2Cl_2$ was then evaporated.

The resulting gummy composition was divided into two portions. One portion was poured into a mold formed by two glass plates with a one-eighth inch (3 millimeter) polyvinyl chloride gasket therebetween. The other portion was poured into a mold formed by two glass sheets with a one-quarter inch (6 millimeter) polyvinyl chloride gasket therebetween. The materials were then cured according to the following cure cycle:

| Time-Temperature Sequence for Benzoyl Peroxide Cure | |
|---|---|
| Cumulative Hours | Temperature, °C. |
| 2 | 63 |
| 4 | 65 |
| 6 | 67 |
| 8 | 77 |
| 10 | 80 |
| 12 | 85 |
| 14 | 88 |
| 16 | 92 |
| 18 | 100 |

Two clear sheets were obtained. The sheets had the following properties:

| | |
|---|---|
| Barcol hardness (0–15 second) (⅛ inch sheet) | 34–26 |
| Barcol hardness (0–15 second) (¼ inch sample) | 37–28 |
| Haze | 4.3 |
| Transmission | 91.2% |
| Yellowness Index | 8.7% |

While the invention has been described with respect to certain exemplification and embodiments thereof, it is not intended that the scope of the invention be limited thereby, but only by the claims appended hereto.

I claim:

1. A polymerizate of
   (1) a diol bis(allyl carbonate); and
   (2) a copolymer of
      (a) a first monomer having the Formula $R_4R_5C=CR_6R_7$, and chosen from the group consisting of:
         (i) $R_4$, $R_5$, and $R_6$ being —H, and $R_7$ being chosen from the group consisting of —H, —$CH_3$, —Cl, —$C_6H_5$, —O—CO—$CH_3$, —O—$CH_2CH_3$, —O—$CH_3$, —CO—OH, —CO—O—$CH_3$, —CO—O—$CH_2CH_3$, and —CO—$NH_2$;
         (ii) $R_4$ and $R_5$ being —H, and $R_6$ and $R_7$ being —Cl;
         (iii) $R_4$ and $R_5$ being —H; $R_6$ being —$CH_3$, and $R_7$ being chosen from the group consisting of —CO—OH, —CO—O—$CH_3$, and —CO—O—$CH_2CH_3$; and
      (b) an acrylate of a cycloalkyldiene.

2. The polymerizate of claim 1 wherein the first monomer is an acrylate.

3. The polymerizate of claim 2 wherein the acrylate of the cycloalkyldiene has the empirical formula

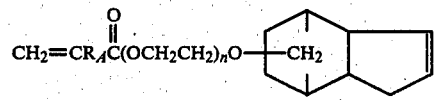

where $R_4$ is chosen from the group consisting of $CH_3$ and H, and n is from 0 to 5.

4. The polymerizate of claim 3 wherein n is zero or one.

5. The polymerizate of claim 1 wherein the diol bis(allyl carbonate) has the formula

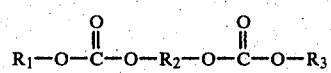

where $R_1$ and $R_3$ are independently chosen from the group consisting of allyl and substituted allyl groups, and $R_2$ is chosen from the group consisting of alkylene groups, alkylene ether groups, alkylene polyether groups, alkylene carbonate groups, and alkylene polycarbonate groups.

6. A method of forming a polymerizate of a bis(allyl carbonate) comprising
   A. forming a monomeric composition comprising:
      (1) the diol bis(allyl carbonate);
      (2) a copolymer of
         (a) a first monomer having the Formula $R_4R_5C=CR_6R_7$, and chosen from the group consisting of:
            (i) $R_4$, $R_5$, and $R_6$ being —H, and $R_7$ being chosen from the group consisting of —H, $CH_3$, —Cl, —$C_6H_5$, —O—CO—$CH_3$, —O—$CH_2CH_3$, —O—$CH_3$, —CO—OH, —CO—O—$CH_3$, —CO—O—$CH_2CH_3$, and —CO—$NH_2$;
            (ii) $R_4$ and $R_5$ being —H, and $R_6$ and $R_7$ being —Cl;
            (iii) $R_4$ and $R_5$ being —H, $R_6$ being —$CH_3$, and $R_7$ being chosen from the group consisting of —CO—OH, —CO—O—$CH_3$, and —CO—O—$CH_2CH_3$; and
         (b) an acrylate of a cycloalkyldiene; and
      (3) an initiator;
   (B) forming a fabricable resin;
   (C) working the fabricable resin; and
   (D) thereafter curing the fabricable resin to form a polymerizate.

7. The method of claim 6 wherein the fabricable resin is pseudoplastic.

8. The method of claim 7 wherein the fabricable resin has a shear stress of $10^3$ to $10^7$ dynes per square centimeter at shear rates of $10^1$ to $10^4$ per second.

9. The method of claim 6 wherein the polymer is a copolymer of (a) an acrylate, and (b) an acrylate of a cycloalkyldiene.

10. The method of claim 9 wherein the acrylate of the cycloalkyldiene has the empirical formula

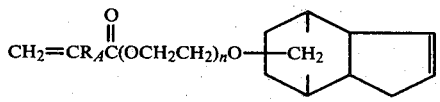

where $R_4$ is chosen from the group consisting of $CH_3$ and H, and n is from 0 to 5.

11. The method of claim 10 wherein n is zero or one.

12. A resin comprising:
  (1) a diol bis(allyl carbonate; and
  (2) a copolymer of
    (a) a first monomer having the Formula $R_4R_5C=CR_6R_7$, and chosen from the group consisting of:
      (i) $R_4$, $R_5$, and $R_6$ being —H, and $R_7$ being chosen from the group consisting of —H, —$CH_3$, —Cl, —$C_6H_5$, —O—CO—$CH_3$, —O—$CH_2CH_3$, —O—$CH_3$, —CO—OH, —CO—O—$CH_3$, —CO—O—$CH_2CH_3$, and —CO—$NH_2$;
      (ii) $R_4$ and $R_5$ being —H, and $R_6$ and $R_7$ being —Cl;
      (iii) $R_4$ and $R_5$ being —H, $R_6$ being —$CH_3$, and $R_7$ being chosen from the group consisting of —CO—OH, —CO—O—$CH_3$, and —CO—O—$CH_2CH_3$; and
    (b) an acrylate of a cycloalkyldiene, said copolymer being swellable by or soluble in the bis(allyl carbonate) monomer; said resin being psuedophotic, fusible, and capable of being cured to a hard resin.

13. The resin of claim 12 wherein the polymer is a copolymer of (a) an acrylate, and (b) an acrylate of a cycloalkyldiene.

14. The resin of claim 13 wherein the copolymer of (a) an acrylate, and (b) an acrylate of a cycloalkyldiene has the formula

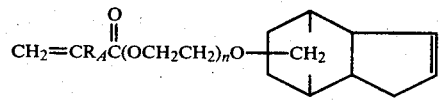

where $R_4$ is chosen from the group consisting of $CH_3$ and H, and n is from 0 to 5.

15. The resin of claim 14 wherein n is zero or one.

16. The resin of claim 12 wherein the diol bis(allyl carbonate) has the empirical formula

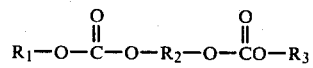

where $R_1$ and $R_3$ are independently chosen from the group consisting of allyl and substituted allyl groups, and $R_2$ is chosen from the group consisting of alkylene groups, alkylene ether groups, alkylene polyether groups, alkylene carbonate groups, and alkylene polycarbonate groups.

* * * * *